(No Model.) 2 Sheets—Sheet 2.
G. A. & D. R. STEDMAN.
COUPLING FOR HOSE, PIPES, &c.
No. 406,964. Patented July 16, 1889.
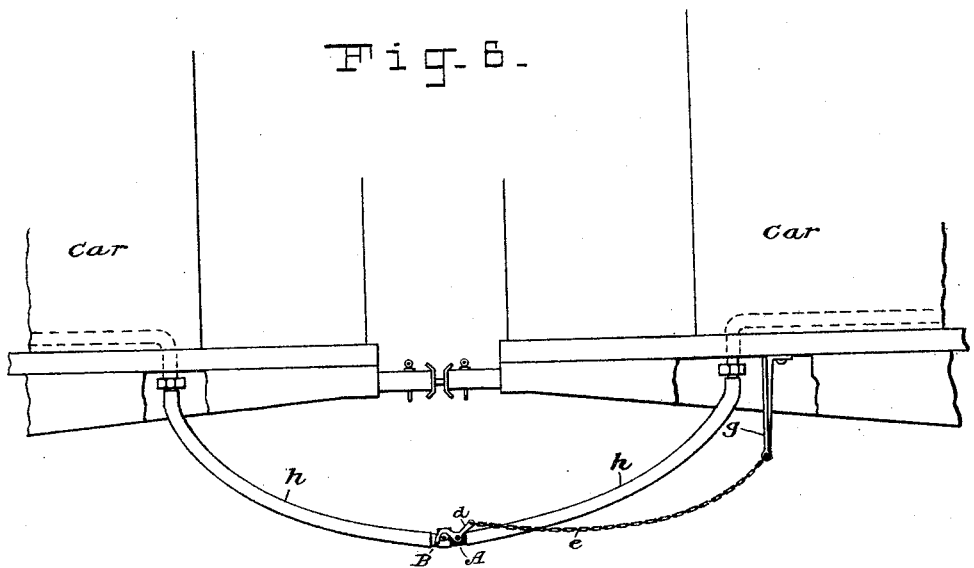
WITNESSES:
INVENTOR:
George A. Stedman,
David R. Stedman,
By Henry Connett
Attorney.

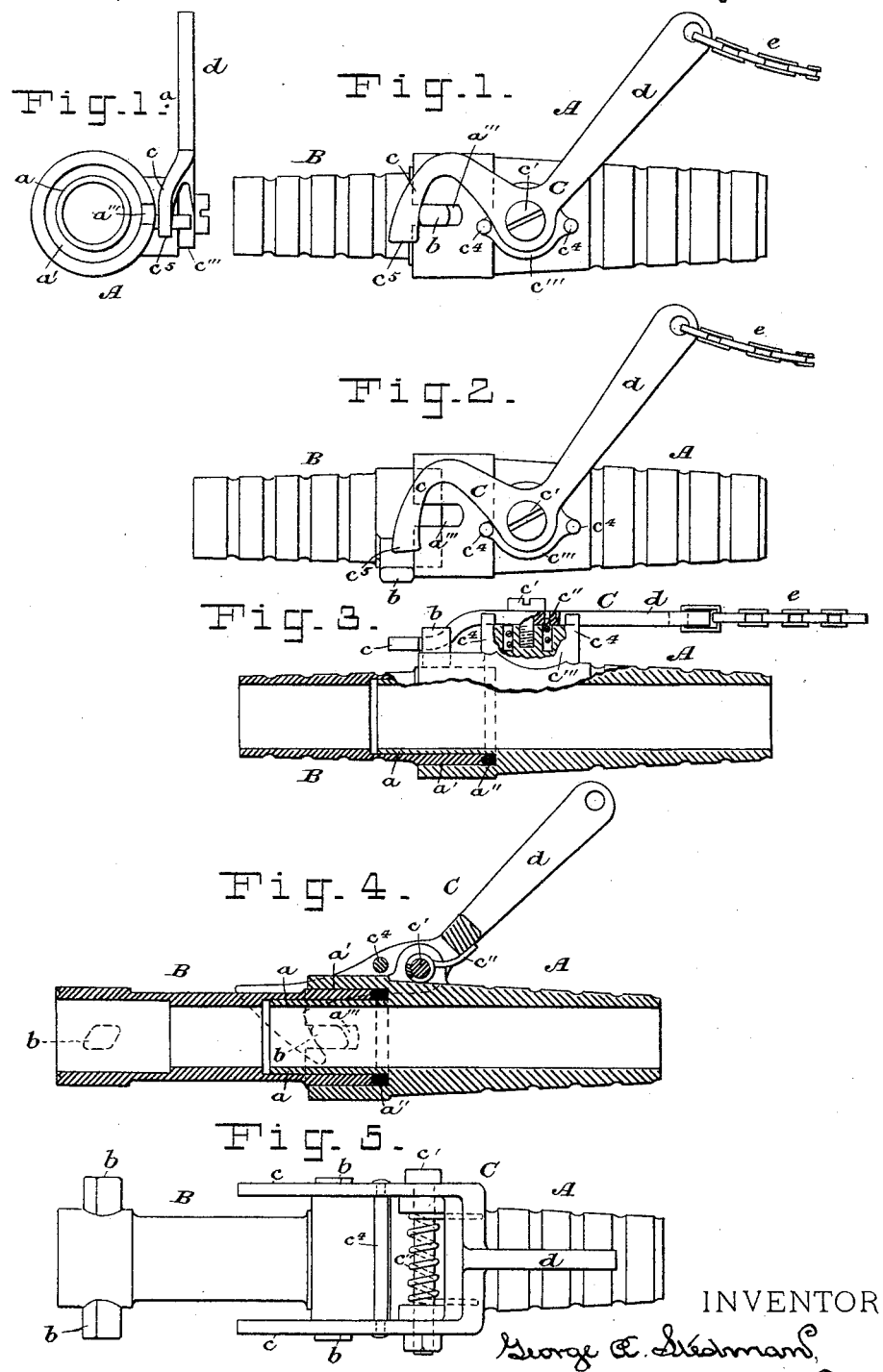

UNITED STATES PATENT OFFICE.

GEORGE A. STEDMAN, OF NEW YORK, N. Y., AND DAVID R. STEDMAN, OF ELIZABETH, NEW JERSEY.

COUPLING FOR HOSE, PIPES, &c.

SPECIFICATION forming part of Letters Patent No. 406,964, dated July 16, 1889.

Application filed June 9, 1888. Serial No. 276,545. (No model.)

*To all whom it may concern:*

Be it known that we, GEORGE A. STEDMAN and DAVID R. STEDMAN, both citizens of the United States, the former residing in the city, county, and State of New York, and the latter residing in Elizabeth, Union county, New Jersey, have jointly invented certain Improvements in Couplings for Hose, Pipes, &c., of which the following is a specification.

Our invention relates to that class of couplings for steam and air pipes commonly employed for detachably connecting the heater-pipes of cars, and especially to that class of such couplings as employ spring-hook latches for holding the members of the coupling in engagement, and have devices whereby these latches will be automatically disengaged should the cars be pulled apart inadvertently while the pipes or hose are still coupled.

Our invention will be hereinafter described, and its novel features carefully defined in the claims.

In the accompanying drawings, which serve to illustrate our invention, Figure 1 is a side elevation of the coupling detached and in its simplest form, and Fig. 1$^a$ is an end view of the principal member of the coupling. Fig. 2 is a view similar to Fig. 1, designed to illustrate the manner of effecting the engagement of the members of the coupling. Fig. 3 is an under side view of the coupling, partly in section to show inclosed parts. Fig. 4 is a sectional elevation of a slightly different form of the coupling, and Fig. 5 is a plan of the same. Fig. 6 is a side view on a small scale of parts of two cars provided with heater-pipes the terminal hose-sections of which are connected by our improved coupling. This view is designed to illustrate the operation of the device for automatically disengaging the members of the coupling.

Referring to the first four figures of the drawings, wherein we have shown our invention embodied in a simple or non-interchangeable coupling suited for the hose-terminals of the heater-pipes of a car, A and B represent, respectively, what we will call, for convenience, the major and minor tubular members of the coupling. On the receiving end of the member A is formed a projecting tubular nipple $a$, and exterior to this nipple, and between it and the shell of the member, is formed an annular socket $a'$ to receive the entering end of the member B, which slips over and snugly embraces the nipple $a$. At the bottom of the socket $a'$ is placed the joint-packing $a''$, upon which the entering end of the member B bears and rests. This packing may be of any of the well-known kinds; but we find asbestus to answer the purpose very well, especially when the pipe is designed to convey or form a conduit for steam. In the shell or outer wall of the socket is formed a notch $a'''$ to receive a lug $b$ on the member B of the coupling.

On the member A is pivotally mounted a hook-latch C, the hook $c$ on which takes over the lug $b$ and draws the member B into the socket in the member A, thus causing its face to press tightly and bear forcibly onto the packing therein. This is effected by so forming the inner bearing-face of the hook $c$ that when the hook is forced down over the lug $b$ it acts in the manner of an inclined plane on the outer face or edge of the same. The curve of the inner face of the hook is not drawn from the pivotal axis $c'$ of the hook-latch as a center, and it is therefore slightly eccentric to said axis. The hook-latch is thrown into engagement by a spring, which may be arranged in any convenient manner. In the present case we have employed a coil-spring $c''$, arranged in an annular spring-recess in a boss $c'''$ on the member A. One end of this spring is secured to the hook-latch and the other to the boss. On the boss are suitable stops $c^4$ to limit the play of the latch-hook on its pivot. This spring latch-hook and the lug $b$ form reciprocal fastenings whereby the members of the coupling are held in engagement. The notch $a'''$ prevents the members from rotating axially after the engagement has been effected.

The engagement of the members in effecting the coupling is conveniently accomplished as illustrated in Fig. 2—that is to say, the end or point of the hook is made somewhat broad and square, as at $c^5$, and projects beyond the end of the member A, in which it is mounted—and when the member B is properly placed on the nipple $a$ the lug $b$ thereon stands in front of same, as seen in the figure. The member B is now rotated axially on the nipple in such a manner as to raise the hook $c$ until the lug registers with the notch $a'''$, when the entry of the lug into said notch allows the member B to be pushed into the socket until it reaches and rests on the packing therein. The hook $c$ now takes over the lug, as seen in Fig. 1, and the spring presses it down, thus drawing the member B up firmly to its seat on the packing.

The projecting nipple $a$ forms a guide to facilitate the operation of coupling, and it also protects the packing from being blown out by the flow of steam through the coupling.

It is important in case the cars should be pulled apart while the hose-sections are coupled that the members of the coupling shall automatically disengage, and thus prevent injury to the connections. The manner of effecting this is illustrated in Fig. 6. On the hook-latch C is an arm $d$, which projects outward from the body of the coupling. To this arm is attached a chain or other similar connector $e$, the other end of which is secured to the car which carries the hook-latch to which said chain is connected, or to a bracket on the same, as seen at $g$ in Fig. 6. This chain is somewhat shorter than the hose-section $h$, and, therefore, should the cars be pulled apart and the coupled hose be drawn out straight the chain will be drawn taut before any appreciable strain is put on the hose or coupling, and thus the latch-hook will be drawn back and disengaged from the lug $b$ by the pull on the arm $d$, which will be drawn back by the chain. The advantage of this construction is that the chain may be permanently attached at both ends, and it need not be disturbed in coupling the pipe or hose sections. If the chain extended from one car to the other, or from one member of the coupling to the other, it would be necessary to couple and uncouple the chain each time the hose was coupled and uncoupled.

In Figs. 1, 2, and 3 there is a single hook-latch mounted on one side of the member A; but two of such latches may be employed, one on each side of said member and adapted to hook over two oppositely-arranged lugs on the member B. This construction is illustrated in Figs. 4 and 5, where the two latches are represented as connected rigidly together and provided with an arm $d$ in common. As in this construction the engagement of the members cannot be effected by the partial rotation of the member B, we have shown the hook $c$ beveled, (see the dotted lines in Fig. 4,) so that the lugs will raise the latches when the member B is entered and forced into the socket.

In Figs. 4 and 5 we have also shown the member B so constructed as to form an interchangeable coupling—that is, a coupling that will operate properly no matter which ends of the cars are brought together. This we effect by simply providing the hose-sections at both ends of the cars with the major or latch-bearing members A of the coupling, and then providing each car with one member B, constructed as illustrated in Figs. 4 and 5—that is to say, with both of its ends (which are alike) constructed to enter the socket in the major member A. This "double-ended" member B will be left in engagement with one or the other of the members A on the car, and will thus enable the hose-sections to be coupled under any conditions. Of course this double-ended member B may be used equally well with that form of the major member A illustrated in Fig. 1; but in that case it will be provided with but one lug $b$ at each end. The shanks or bodies of the members of the coupling will be constructed and adapted to receive the hose, which may be slipped on and secured in the usual way—that is, by means of a wrapping of wire or by clamps of some kind. We have not shown the hose in the principal figures. Where jointed metal pipes are employed in lieu of flexible hose the members of the coupling may be secured to these pipes in any manner known in the art.

When a double-ended member B is employed, this will be, of course, a detachable part, and it may be detached from one end of the car and attached at the other end at will. On a road where the cars are never turned around the coupling as represented in Fig. 1 will serve, a member A being secured to the hose at one end of each car and a member B secured to the hose at the opposite end.

We are aware that in a form of hose-coupling provided with automatic valves in the members of the coupling an intermediate tubular part has been employed for the purpose of holding open the valves when the coupling has been effected; but this is not an interchangeable coupling in any sense, nor does said intermediate part perform the same functions as our double-ended minor member.

Having thus described our invention, we claim—

1. In a coupling, the combination, with the major member provided with a packed socket to receive the minor member and a guide-notch $a'''$ to receive a lug on said minor member, of the minor member provided with a lug $b$ to engage said notch $a'''$, a spring hook-latch mounted on said major member, with its hooked extremity arranged to stand normally across the notch $a'''$ and to engage said lug $b$ when the latter stands in said notch, and the chain or connector $e$, attached at one end to the arm of said hook-latch and at the other end to the car carrying said latch, substantially as set forth.

2. In a coupling, the combination, with the major member provided with a packed socket to receive the minor member and with a notch $a'''$, of the spring hook-latch mounted on said major member, its hook having a broad end $c^5$, which projects beyond the end of said major member and stands normally across and closes the entrance of said notch $a'''$, and the minor member of the coupling provided with a lug $b$, which engages said notch $a'''$ when said latch is displaced, said lug $b$ standing in front of the broad end of the latch when the minor member is inserted in the major member, whereby partial rotation of the minor member causes said lug to lift and displace said latch and thus open the entrance to said notch, as set forth.

3. The combination, in an interchangeable coupling for use on cars, of the major member A, provided with a socket to receive the minor member and with a notch $a'''$ to receive a stud on the said minor member, the spring hook-latch mounted on said major member, and the double-ended minor member constructed alike at both ends and provided at each end with a stud to engage the notch $a'''$ in the major member, said latch-hook being arranged to engage said stud when the members of the coupling are engaged, as set forth.

In witness whereof we have hereunto signed our names in the presence of two subscribing witnesses.

GEORGE A. STEDMAN.
DAVID R. STEDMAN.

Witnesses:
HENRY CONNETT,
J. D. CAPLINGER.